Oct. 4, 1927.  M. F. CARR  1,644,236

LUBRICATING NIPPLE AND CAP THEREFOR

Filed Feb. 1, 1923

Inventor.
Moses F. Carr.
Attys

Patented Oct. 4, 1927.

1,644,236

UNITED STATES PATENT OFFICE.

MOSES F. CARR, OF LEXINGTON, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING NIPPLE AND CAP THEREFOR.

Application filed February 1, 1923. Serial No. 616,344.

This invention pertains to improvements in lubricating nipples and caps therefor. It is among the objects of the invention to provide a lubricating nipple of improved construction for quick detachable engagement with a source of lubricant under pressure and a superior dust-excluding cap for engagement therewith.

In the drawings, which show a preferred form of one embodiment of my invention:

Figure 1:
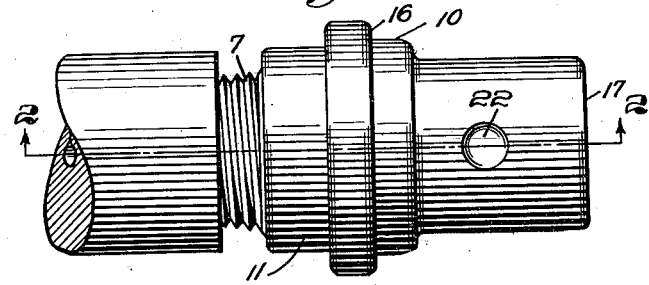
Figure 1 is a side elevation of a lubricant-receiving nipple protected by a cap and connected to a part to be lubricated.
Figure 2:
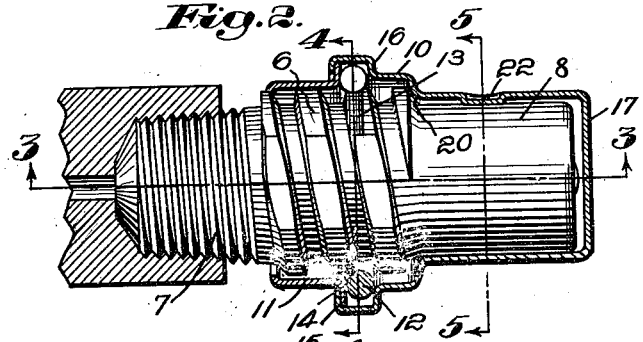
Fig. 2 is a section on the line 2—2 of Fig. 1, the nipple being shown in elevation.
Figure 3:
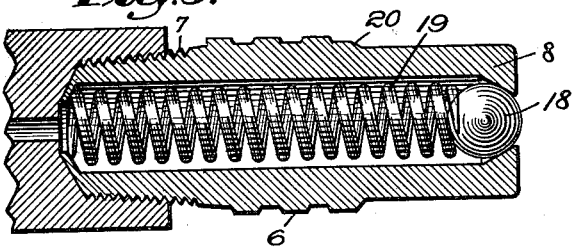
Fig. 3 is a section on the line 3—3 of Fig. 2, showing the nipple with the cap removed, being partly in elevation.
Figure 4:
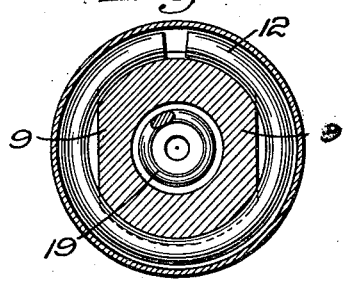
Fig. 4 is a section on the line 4—4 of Fig. 2, being partly in elevation.
Figure 5:
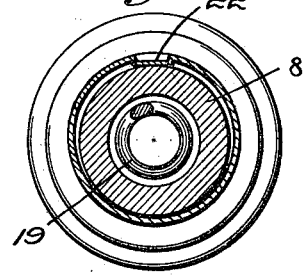
Fig. 5 is a section on the line 5—5 of Fig. 2, being partly in elevation.

Referring to the drawings and to the preferred form of my invention selected for illustrative purposes, I have shown a nipple presenting an enlarged central portion having relatively steep pitch threads 6. At one side of said central portion is provided a reduced end portion threaded at 7 for engagement with the part to be lubricated, and at the other side of said central portion I have shown a cylindrical part 8 for engagement by a sealing element of the coupling member commonly used in high pressure lubricating systems of the general type disclosed in the patent to Gullborg, No. 1,307,734, dated June 24, 1919. The central threaded portion 6 is flattened at opposite sides, as best shown in Figs. 2 and 4, to provide wrench-receiving surfaces 9. The preferred form of cap illustrated is formed of sheet metal and includes a top portion 10 completely covering a cylindrical portion of the nipple and a part of the threaded portion thereof. A second stamped part 11 engaged with said first stamped part 10 covers the remainder of the enlarged or steep pitch threaded portion of the nipple. Between the two stamped portions of the cap is enclosed a spring 12, preferably circularly expansible to pass over a portion of the enlarged or steep pitch threaded part of the nipple and to engage a groove 13 cut in said threaded portion. The spring is held against displacement relative to the cap by a flange 14 on the stamped portion 11 of the cap, which flange also serves as a point of engagement for the in-turned edge 15 of the stamped portion 10, thus holding the two in assembled relationship. The diameter of the stamped portion 10 opposite the spring 12 is such as to permit expansion thereof, and movement of the spring 12 in a direction away from the flange 11 is prevented by a shoulder 16. It is desirable that the top portion 17 of the cap be kept out of contact with the ball 18 closing the entrance of the nipple by resilient pressure of the spring 19. To this end, I have provided a shoulder 20 on the cap for engagement with that face of the enlarged or steep pitch threaded portion of the nipple adjacent the cylindrical portion 8 thereof. The spring 12 holds the cap firmly in engagement with the nipple. I may, if desired, to insure against rattle, indent at 22 the cap portion so that there is resilient pressure against the cylindrical portion of the nipple. Thus rattling is prevented, even though the cap casing but loosely engages the spring 12.

While I have shown and described a preferred embodiment of my invention, it will be understood that I have done so for purposes of clarification and not for purposes of limitation. My invention is best defined in the following claims.

Claims:

1. A lubricant receiving nipple comprising a cylindrical end portion, a second end portion threaded for engagement with the part to be lubricated, and a central enlarged threaded portion having a groove intersecting a portion of the thread thereof, a cooperating cap for covering the cylindrical portion and the enlarged threaded portion of the nipple to exclude dust and dirt therefrom, and a separate spring member carried in said cap for engagement with the groove and thread of said enlarged portion in said nipple.

2. A lubricant receiving nipple presenting a central enlarged threaded portion, reduced end portions, one being cylindrical in form and the other being threaded for engagement with the part to be lubricated, said enlarged thread portion having a groove turned therein intersecting a portion of the thread thereof, and a cap for said nipple, said cap having a spring for engagement with said groove and thread and an indented portion for resilient engagement with said cylindrical portion of the nipple.

3. A lubricant receiving nipple comprising a cylindrical end portion having a ball check valve in the end thereof, an enlarged central portion having threads thereon and a circular groove turned therein to intersect a portion of said threads, and a second threaded end portion for engagement with the part to be lubricated, a dust-excluding cap for said nipple, said cap comprising a reduced end portion adapted to surround the cylindrical end of the nipple and of such length that the end of the cap is spaced from the ball check valve in the nipple, said cap having an enlarged portion formed of inter-engaging sleeves, that portion of the cap adjacent the ends of said sleeves being still further enlarged to house a spring for engagement with said groove.

4. A dust-excluding cap for lubricant receiving nipples comprising a closed cylindrical end portion and an enlarged portion, said enlarged portion having adjacent the center thereof an annular spring retaining portion for housing a radially expansible spring carried thereby.

5. A dust-excluding cap for a lubricant receiving nipple including a cylindrical end portion, an enlarged portion connected thereto and having located substantially centrally thereof an annular enlargement, a radially expansible spring mounted in said enlargement, and means formed in said cylindrical portion for resiliently pressing said cap against a nipple.

In testimony whereof, I have signed my name to this specification.

MOSES F. CARR.